(12) United States Patent
Hayashi et al.

(10) Patent No.: US 8,088,517 B2
(45) Date of Patent: Jan. 3, 2012

(54) LITHIUM ION SECONDARY BATTERY AND PRODUCTION METHOD THEREOF

(75) Inventors: Tetsuya Hayashi, Osaka (JP); Tsumoru Ohata, Kyoto (JP)

(73) Assignee: Panasonic Corporation, Osaka (JP)

( * ) Notice: Subject to any disclaimer, the term of this patent is extended or adjusted under 35 U.S.C. 154(b) by 1133 days.

(21) Appl. No.: 10/576,421

(22) PCT Filed: Dec. 8, 2004

(86) PCT No.: PCT/JP2004/018264
§ 371 (c)(1),
(2), (4) Date: Apr. 19, 2006

(87) PCT Pub. No.: WO2005/057712
PCT Pub. Date: Jun. 23, 2005

(65) Prior Publication Data
US 2007/0059590 A1   Mar. 15, 2007

(30) Foreign Application Priority Data
Dec. 12, 2003   (JP) .................. 2003-414483

(51) Int. Cl.
H01M 2/14    (2006.01)
H01M 2/16    (2006.01)
H01M 10/16   (2006.01)
H01M 6/10    (2006.01)
H01M 4/13    (2006.01)
H01M 4/82    (2006.01)

(52) U.S. Cl. ..... 429/246; 429/94; 429/208; 429/231.95; 429/247; 29/623.5

(58) Field of Classification Search ............ 429/94, 429/211, 208, 246, 247, 233, 186, 231.95; 29/623.5
See application file for complete search history.

(56) References Cited

U.S. PATENT DOCUMENTS
5,948,464 A    9/1999  Delnick
(Continued)

FOREIGN PATENT DOCUMENTS
CN    1186357 A    7/1998
(Continued)

OTHER PUBLICATIONS
Machine Translation and Abstract in English of JP 09-035738.*
(Continued)

Primary Examiner — Barbara Gilliam
Assistant Examiner — Claire L Roe
(74) Attorney, Agent, or Firm — McDermott Will & Emery LLP (57) ABSTRACT

A lithium ion secondary battery having an electrode group that includes: a winding core, a positive electrode containing a positive electrode core member and a positive electrode active material layer, a negative electrode comprising a negative electrode core member and a negative electrode active material layer, and a porous film including a filler and a binder formed on at least one of the positive and negative electrodes which are wound around the winding core. The positive electrode and/or the negative electrode have/has, on the initial winding side, a region where the active material layer is carried on only one side of the core member and a region where the active material layer is carried on neither side of the core member, at a position closer to the initial winding position than the region where the active material layer is carried on only one side of the core member.

8 Claims, 6 Drawing Sheets

U.S. PATENT DOCUMENTS

| | | | |
|---|---|---|---|
| 5,989,743 A | | 11/1999 | Yamashita |
| 6,022,642 A | * | 2/2000 | Tsukamoto et al. ........... 429/312 |
| 6,217,623 B1 | * | 4/2001 | Reichert et al. .............. 29/623.5 |
| 2002/0146626 A1 | * | 10/2002 | Komatsu et al. .............. 429/246 |
| 2003/0180605 A1 | * | 9/2003 | Mizutani .......................... 429/94 |
| 2004/0121232 A1 | * | 6/2004 | Kato et al. .................... 429/217 |

FOREIGN PATENT DOCUMENTS

| | | | |
|---|---|---|---|
| JP | 4-109551 A | | 4/1992 |
| JP | 8-153542 A | | 6/1996 |
| JP | 9-35738 A | | 2/1997 |
| JP | 09035738 A | * | 2/1997 |
| JP | 9-147916 A | | 6/1997 |
| JP | 9-161847 A | | 6/1997 |
| JP | 10-106530 A | | 4/1998 |
| JP | 11-283676 A | | 10/1999 |
| JP | 3200340 B2 | | 6/2001 |
| JP | 3237015 B2 | | 10/2001 |
| JP | 2003-208918 A | | 7/2003 |
| JP | 2004063343 A | * | 2/2004 |

OTHER PUBLICATIONS

Machine Translation and Abstract in English of JP 2004/63343.*
Chinese Office Action, with English Translation, issued in Chinese Patent Application No. CN 2004-80039418 dated on Apr. 18, 2008.

* cited by examiner

LITHIUM ION SECONDARY BATTERY AND PRODUCTION METHOD THEREOF

RELATED APPLICATION

This application is the U.S. National Phase under 35 U.S.C. §371 of International Application No. PCT/JP2004/018264, filed on Dec. 8, 2004, which in turn claims the benefit of Japanese Application No. 2003-414483, filed on Dec. 12, 2003, the disclosures of which Applications are incorporated by reference herein.

TECHNICAL FIELD

The present invention relates to a lithium ion secondary battery and a production method thereof, and particularly, to a battery including a wound-type electrode group that uses an electrode with a porous film formed thereon and a production method thereof.

BACKGROUND ART

Electrochemical batteries, such as lithium ion secondary batteries, include a separator that is interposed between a positive electrode and a negative electrode. This separator has the function of electrically insulating the positive electrode from the negative electrode, as well as the function of retaining an electrolyte. Currently, a microporous thin film sheet, composed of polyethylene, is mainly used as the separator in lithium ion secondary batteries.

Further, lithium ion secondary batteries include a wound-type electrode group which is prepared, for example, by laminating and winding the positive electrode, the negative electrode and the separator. Such an electrode group, wound so as to have an oval cross section, is also used in rectangular batteries.

With respect to the winding method, various proposals have been made. For example, it is proposed to use a winding core that is preferable, when the electrodes are thick, for eliminating the influence of gaps created by the edges of the electrodes on the initial winding side (see, e.g., Japanese Laid-Open Patent Publication No. Hei 9-35738).

Also, in order to improve high-rate characteristics and life characteristics, it is proposed to form a porous film, composed of a filler and a binder, on the surface of at least one of the positive electrode and the negative electrode, instead of the conventional structure of providing a separator between the positive electrode and the negative electrode (see, e.g., Japanese Laid-Open Patent Publication No. Hei 10-106530 (claim 15 and FIG. 2)).

Such an electrode group is described below with reference to FIG. 5.

Figure 5:
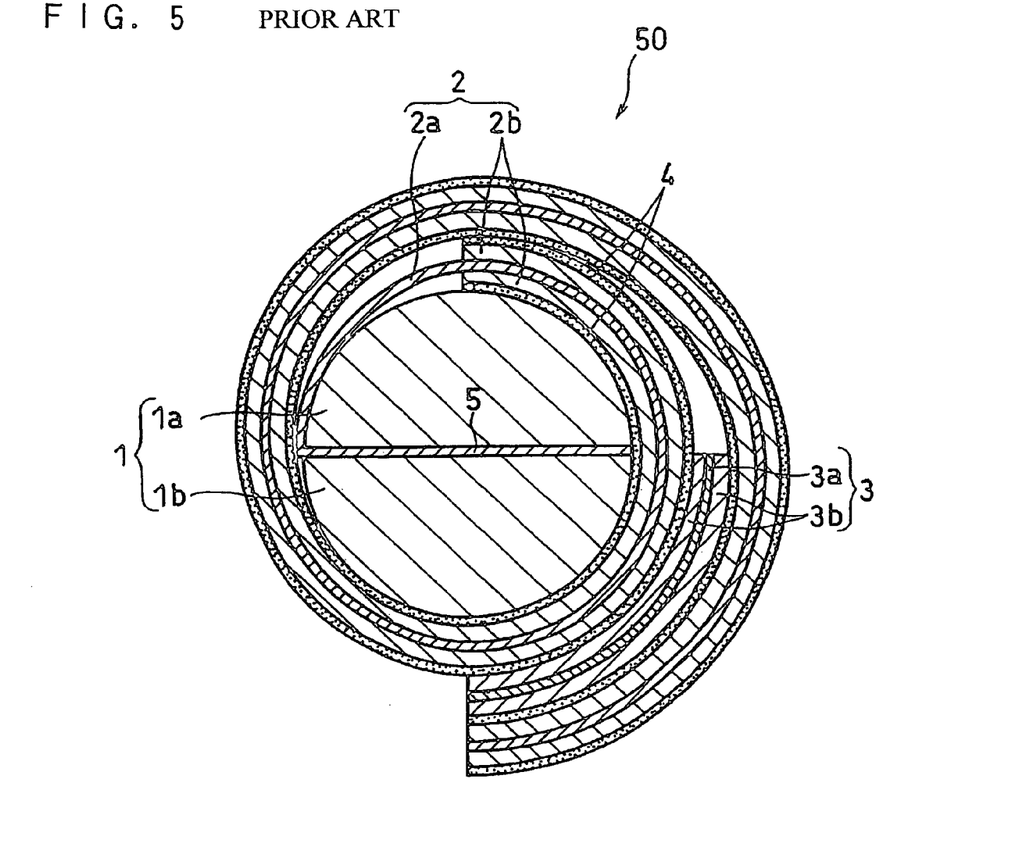
FIG. 5 is a schematic transverse sectional view illustrating a part of an electrode group 50 of a conventional lithium ion secondary battery.

An electrode group 50 of FIG. 5 includes a winding core 1, a negative electrode 2, a positive electrode 3, and a porous film 4. The winding core 1 consists of an upper winding core 1a and a lower winding core 1b. The negative electrode 2 comprises a negative electrode core member 2a and a negative electrode active material layer 2b formed on each side of the negative electrode core member 2a. Likewise, the positive electrode 3 comprises a positive electrode core member 3a and a positive electrode active material layer 3b formed on each side of the positive electrode core member 3a. The porous film 4 is formed on the surfaces of the negative electrode active material layers 2b.

This electrode group is produced as follows. First, the edge of the core member of the negative electrode 2 on the initial winding side is exposed, and the exposed part 5 of the core member is sandwiched between the upper winding core 1a and the lower winding core 1b. Then, the negative electrode 2 and the positive electrode 3 are wound around the winding core 1, with the positive electrode 3 between the negative electrode 2.

In the electrode group of FIG. 5, an independent separator is not provided between the negative electrode and the positive electrode, and the porous film is bonded to the surfaces of at least one of the positive electrode and the negative electrode. Thus, there is no need to prepare an independent separator, so that the structure of the electrode group can be simplified. Further, since the porous film is integrated into the electrode, it is also possible to prevent a short-circuit between the positive electrode and the negative electrode resulting from the displacement of a separator.

Figure 6:
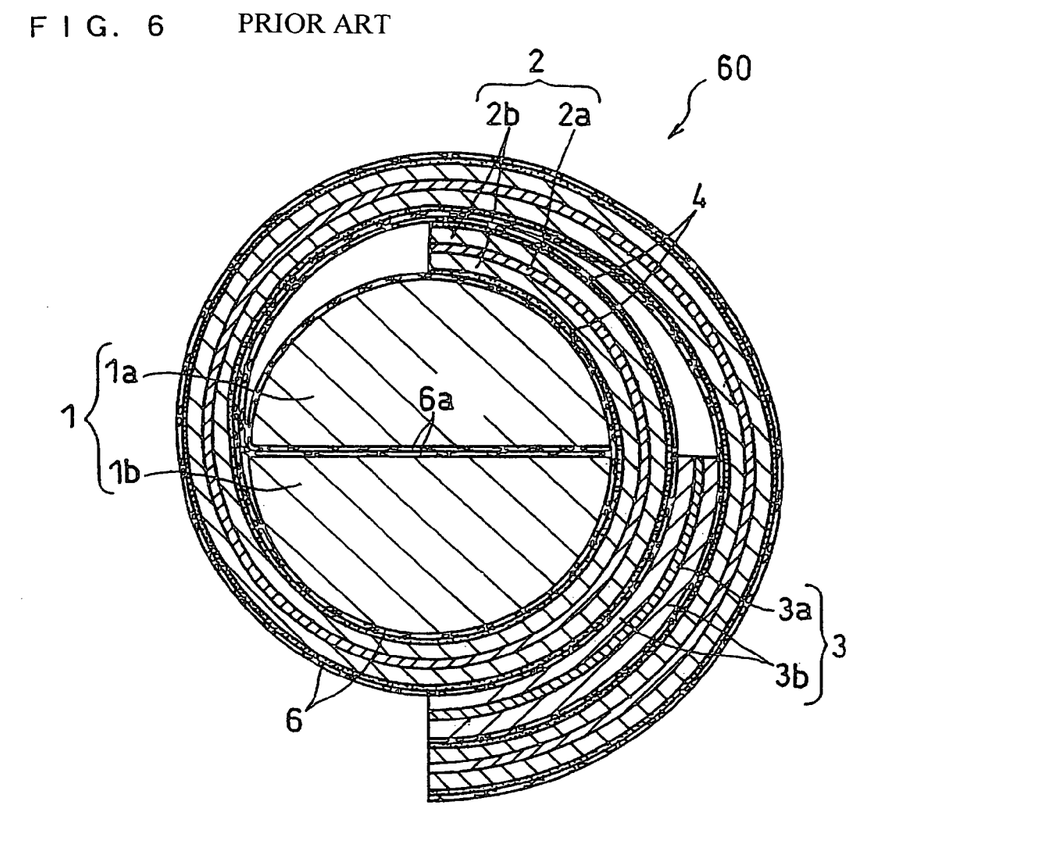
FIG. 6 is a schematic transverse sectional view illustrating a part of an electrode group 60 of another conventional lithium ion secondary battery.

Also, a separator can be used together in the electrode group as shown in FIG. 5. FIG. 6 shows an electrode group 60 having a separator. In FIG. 6, the same constituent elements as those in FIG. 5 are given the same numbers.

In the electrode group 60 of FIG. 6, the negative electrode 2 has a separator 6 on each side thereof, i.e., on each of the porous films 4. The separator 6 extends beyond the initial winding position of the negative electrode 2.

This extended part 6a of the separator 6 is sandwiched between the upper winding core 1a and the lower winding core 1b. Then, the negative electrode 2 and the positive electrode 3 are wound around the winding core 1, with the positive electrode 3 between the negative electrode 2, to produce an electrode group.

DISCLOSURE OF THE INVENTION

Problem that the Invention is to Solve

However, in the electrode group as illustrated in FIG. 5 or FIG. 6, the porous film does not have a structure capable of retaining the strength in the direction parallel to the surface of the electrode to which it is bonded, unlike an independent separator such as a microporous thin film sheet. Therefore, when the positive electrode and the negative electrode are wound to form an electrode group, the porous film may become broken or fall off, due to the strain exerted on the wound electrode near the innermost turn, or the gaps created by the edges of the electrodes. In this case, the negative electrode and the positive electrode become short-circuited.

It is therefore an object of the present invention to provide a lithium ion secondary battery having an electrode group in which the breakage of a porous film is reduced to improve battery safety, and a production method thereof.

Means for Solving the Problem

The present invention relates to a lithium ion secondary battery including an electrode group that comprises: (1) a winding core, (2) a positive electrode comprising a positive electrode core member and a positive electrode active material layer carried on the positive electrode core member, (3) a negative electrode comprising a negative electrode core member and a negative electrode active material layer carried on the negative electrode core member, and (4) a porous film formed on at least one of the positive electrode and the negative electrode. The porous film comprises a filler and a binder, and the positive electrode and the negative electrode are wound around the winding core. The positive electrode and/or the negative electrode have/has, on the initial winding side, a region where the active material layer is carried on neither side of the core member and an adjoining region where the active material layer is carried on only one side of the core member.

In the lithium ion secondary battery, a separator is preferably disposed between the positive electrode and the negative electrode.

In the lithium ion secondary battery, a lead is preferably provided in the region of the positive electrode or the negative electrode where the active material layer is carried on neither side of the core member.

On the initial winding side of the electrode group of the lithium ion secondary battery, it is preferred that the winding core have a recess at a position where it comes into contact with the front end of the active material layer of the positive electrode or the negative electrode, the recess corresponding to at least a part of the thickness of the positive electrode or the negative electrode.

The present invention also relates to a method for producing a lithium ion secondary battery, including the steps of: (a) forming a positive electrode active material layer on both sides of a positive electrode core member, to obtain a positive electrode, (b) forming a negative electrode active material layer on both sides of a negative electrode core member, to obtain a negative electrode, (c) forming a porous film that comprises a filler and a binder on a surface of the positive electrode and/or the negative electrode, and (d) winding the positive electrode and the negative electrode around a winding core, to obtain an electrode group. The step (a) and/or the step (b) include/includes the step of providing, on the initial winding side of the positive electrode and/or the negative electrode, a region where the active material layer is carried on neither side of the core member and an adjoining region where the active material layer is carried on only one side of the core member.

In the step (d) of the production method of a lithium ion secondary battery, it is preferred that the positive electrode and the negative electrode be wound around the winding core with a separator interposed therebetween.

It is preferred that the production method of a lithium ion secondary battery further include the step of welding a lead to the region of the positive electrode or the negative electrode where the active material layer is carried on neither side of the core member.

It is preferred that the production method of a lithium ion secondary battery further include the step of, on the initial winding side, providing the winding core with a recess at a position where it comes into contact with the front end of the active material layer of the positive electrode or the negative electrode, the recess corresponding to at least a part of the thickness of the positive electrode or the negative electrode.

Effect of the Invention

The present invention reduces the strain exerted on the electrodes near the innermost turn of an electrode group, the strain resulting from the gaps created by the edges of the electrodes, and the like, thereby making it possible to suppress the breakage of a porous film. Accordingly, it becomes possible to improve battery safety.

BEST MODE FOR CARRYING OUT THE INVENTION

The present invention is hereinafter described with reference to drawings.

Embodiment 1

Figure 1:
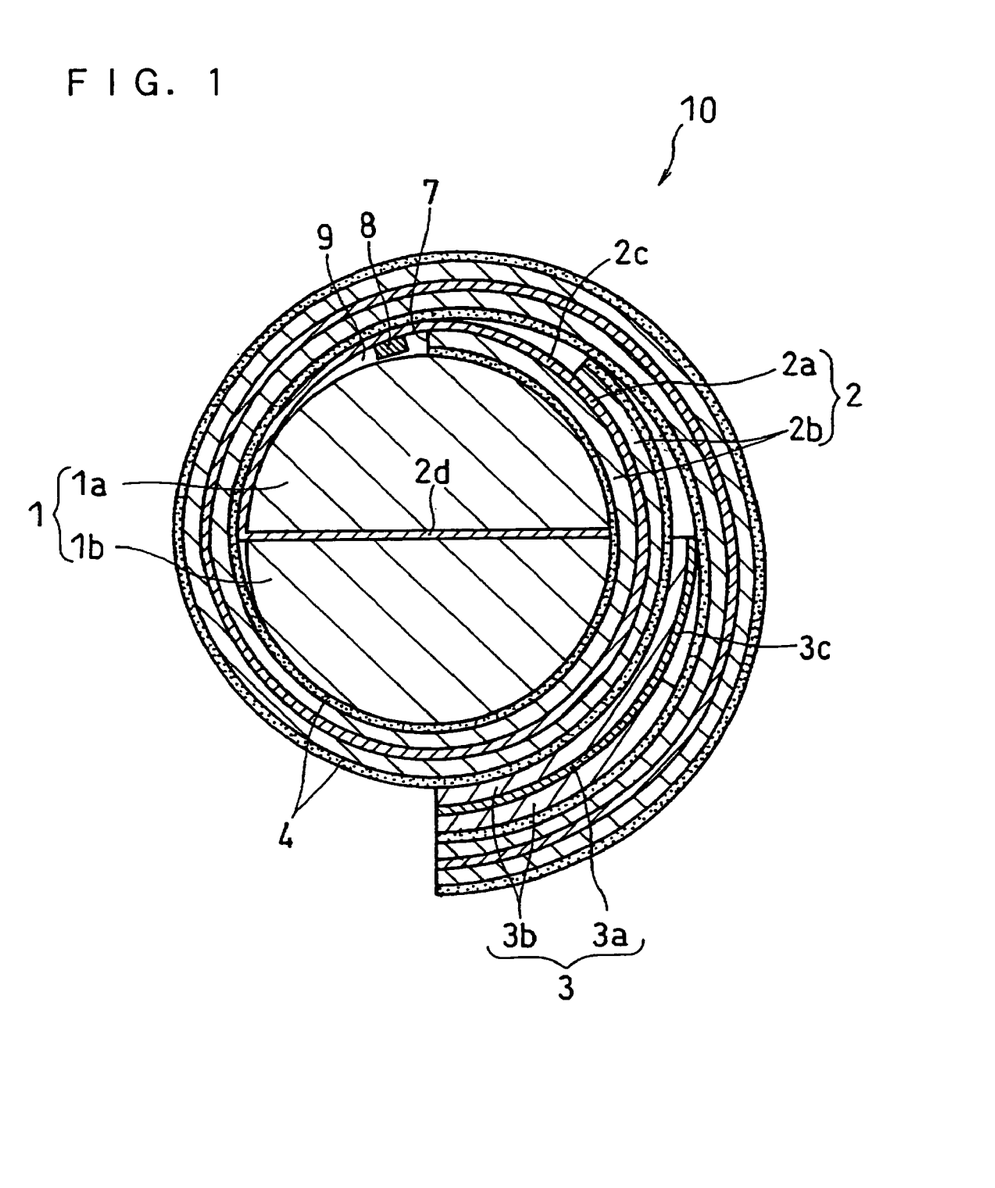
FIG. 1 is a schematic transverse sectional view illustrating a part of an electrode group 10 of a lithium ion secondary battery according to one embodiment of the present invention.

FIG. 1 shows a part of an electrode group 10 of a lithium ion secondary battery according to one embodiment of the present invention.

The electrode group 10 of FIG. 1 includes a winding core 1, a belt-like negative electrode 2, a belt-like positive electrode 3, and a porous film 4. In this electrode group, the positions of the edges of the negative electrode 2 and the positive electrode 3 on the initial winding side are different.

In this embodiment, the winding core 1 is cylindrical. Also, the winding core 1 is divided into an upper winding core 1a and a lower winding core 1b along the longitudinal axis of the cylinder, and the upper winding core 1a and the lower winding core 1b have a semicircular cross-section.

Also, the upper winding core 1a and the lower winding core 1b are secured to each other by winding the negative electrode 2 and the positive electrode 3.

It should be noted that the winding core may have other forms.

The negative electrode 2 comprises a negative electrode core member 2a and a negative electrode active material layer 2b formed on each side of the negative electrode core member 2a. The positive electrode 3 comprises a positive electrode core member 3a and a positive electrode active material layer 3b formed on each side of the positive electrode core member 3a.

The porous film 4 comprising a filler and a binder is formed on the whole surface of each negative electrode active material layer 2b of the negative electrode 2. The porous film 4 performs the function of insulating the negative electrode 2 from the positive electrode 3.

The porous film 4 is bonded to the negative electrode active material layers 2b, thus being integrated with the negative electrode 2. Although the porous film 4 may be bonded to the positive electrode 3 for integration, it is preferably formed on the negative electrode 2 so as to be integrated with the negative electrode 2, since the negative electrode 2 is usually larger in size than the positive electrode 3. Also, the porous film 4 may be formed on both the positive electrode and the negative electrode. This applies to the following embodiments 2 to 4.

Further, the negative electrode 2 has, on the initial winding side, a region 2c where the active material layer is carried on only one side of the core member. Likewise, the positive electrode 3 also has, on the initial winding side, a region 3c where the active material layer is carried on only one side of the core member. In the regions 2c and 3c where the active material layer is carried on only one side of the core member, the active material layer is formed on the winding core side (inner side) of the core member. On the other hand, in the regions 2c and 3c, the active material layer is not formed on the outer side of the core member, so that the core member is exposed.

Also, in the regions 2c and 3c, the active material layer may be formed on the outer side of the core member.

Further, at a position closer to the initial winding position than the region 2c where the active material layer is carried on only one side of the core member, the negative electrode 2 has a region 2d where the active material layer is carried on neither side of the core member.

In this way, by forming the regions 2c and 3c where the active material layer is carried on only one side of the core member on the initial winding side of the electrodes, it becomes possible to reduce the strain exerted on the electrodes at the innermost turn of the electrode group.

Also, due to the provision of the regions 2c and 3c, the thickness of the negative electrode 2 and/or the positive electrode 3 increases stepwise. That is, for example, in the case of the negative electrode 2, the gap created by an edge 7 becomes almost half that of an electrode having no region 2c. Therefore, near the edge of the negative electrode 2, the active material layers and the porous films can be more effectively prevented from becoming broken or falling off.

Also, it becomes possible to prevent the cracking at the part of the electrode overlapped on the edge 7 of the negative electrode 2 and at the outer parts of the electrode, and the subsequent breakage or falling-off of the active material layers and the porous films 4.

This also applies to the positive electrode.

When wound, the active material layer carried on the winding core side of the core member is largely influenced by the gap created by the edge of the electrode at the innermost turn of the electrode group. Thus, in the regions 2c and 3c, the active material layer is preferably formed on the winding core side of the core member, in order to prevent the breakage of the active material layer of the electrode on the winding core side and the porous film formed thereon.

Also, in the region 2c or 3c where the active material layer is carried on only one side of the core member, the active material layer may be formed on the outer side of the core member such that its thickness gradually increases from the edge thereof.

Also, the region where the active material layer is carried on only one side of the core member may be provided for both the positive electrode and the negative electrode, or it may be provided for only one of the positive electrode and the negative electrode.

Further, the length of the region where the active material layer is carried on only one side of the core member is preferably 1 to 5 mm. If the length of this region is less than 1 mm, the electrode thickness does not increase stepwise, but increases substantially in one step, so that the gap becomes large. Also, if the length of the region is longer than necessary, the capacity decreases.

In the electrode group, the position of the negative electrode and the position of the positive electrode may be interchanged. This applies to the following Embodiments 2 to 4.

Further, in the electrode group of FIG. 1, a negative electrode lead 8 is welded to the region 2d of the negative electrode 2 where the active material layer is carried on neither side of the core member. The welding position of the negative electrode lead 8 is not particularly limited. For example, in the part 2c where the active material layer is carried on only one side of the core member, when the active material layer is carried on the winding core side of the negative electrode core member, there is a space 9 between the winding core 1 and the region 2d where the active material layer is carried on neither side of the core member of the negative electrode 2, as illustrated in FIG. 1. It is therefore preferable to weld the negative electrode lead 8 to the winding core side of the negative electrode core member such that the negative electrode lead 8 is disposed in the space 9. In this way, the provision of the negative electrode lead 8 in the space 9 makes it possible to prevent the creation of further gaps relative the outer parts of the electrodes of the electrode group, unlike the provision of the negative electrode lead 8 on the outer side of the negative electrode core member. This makes it possible to further reduce the breakage of the active material layers and the porous films.

It should be noted that the negative electrode lead 8 may be disposed at the outermost turn of the electrode group in a conventional manner.

Also, in the part 2c where the negative electrode active material layer is carried on only one side of the core member, when the active material layer is carried on the outer side of the negative electrode core member, there is a space between the region 2d where the active material layer is carried on neither side of the core member of the negative electrode 2 and the electrode at the outer turn. Therefore, the negative electrode lead may be welded on the outer side of the negative electrode core member such that the negative electrode lead is disposed in the space. This makes it possible to further reduce the breakage of the active material layers and the porous films in the same manner as the above.

The positive electrode may be any conventionally known one in the art. For example, the positive electrode comprises an active material layer containing a positive electrode mixture and a positive electrode core member carrying the active material layer. The positive electrode active material may be a composite oxide such as lithium cobaltate or lithium nickelate, etc. Also, the positive electrode core member may be made of aluminum, etc.

The thickness of the positive electrode core member is preferably 8 μm to 50 μm, and the thickness of the rolled positive electrode active material layer is preferably 20 μm to 100 μm per one side.

The negative electrode may be any conventionally known one in the art. For example, the negative electrode comprises an active material layer containing a negative electrode active material and a negative electrode core member carrying the active material layer. The negative electrode active material may be a carbonaceous material such as artificial graphite or natural graphite, etc. Also, the negative electrode core member may be made of copper, etc.

The thickness of the negative electrode core member is preferably 5 μm to 50 μm, and the thickness of the rolled negative electrode active material layer is preferably 20 μm to 150 μm per one side.

The porous film 4 comprises a binder and a filler. The porous film 4 needs to be flexible enough to absorb the strain applied to the electrode positioned at the innermost turn of the electrode group. It also needs to be resistant to heat such that it is stable with respect to heat applied during the production process of the battery. It is preferable that the porous film 4 contain as the binder a resin that is amorphous, highly heat-resistant, and rubber elastic. It is particularly preferable that it contain as the binder a rubber-like polymer including an acrylonitrile unit.

It is preferable that the filler be electrochemically stable inside the lithium ion battery, as well as heat-resistant as described above. Further, the filler is preferably a material suitable for forming a slurry in producing the porous film. The filler is most preferably an inorganic oxide. Exemplary inorganic oxides include alumina, titania, silica, and zirconia. They may be used alone or in combination of two or more of them. Also, various resin fine particles can be used as the filler.

The thickness of the porous film is preferably in the range of 20 μm to 30 μm when the electrode group has no separator.

Next, the method of producing the electrode group used in the lithium ion secondary battery of the present invention is described below.

A positive electrode is produced by applying a positive electrode mixture comprising a positive electrode active material, a conductive agent, and a binder onto both sides of a positive electrode core member, and in a specific region, applying the mixture onto only one side of the core member (step (1)). It should be noted that the active material layer is carried on neither side of the core member, from one end of the positive electrode nearer the region where the active material layer is carried on only one side of the core member, to the starting position of the region where the active material layer is carried on only one side of the core member.

An exemplary method for producing a positive electrode is given below. 100 parts by weight of lithium cobaltate powder is mixed with 3 parts by weight of acetylene black powder which serves as the conductive agent and 4 parts by weight of polyvinylidene fluoride resin serving as the binder. The resultant mixture is dispersed in dehydrated N-methyl-2-pyrrolidone (NMP), to prepare a positive electrode mixture slurry. The resultant slurry is applied onto both sides of a positive electrode core member made of aluminum foil while leaving the region where the active material layer is carried on neither side on the positive electrode core member. In a specific region, the slurry is applied onto only one side of the core member, to obtain a positive electrode precursor. This positive electrode precursor is dried and rolled, to obtain a positive electrode.

A negative electrode is produced by applying a negative electrode mixture comprising a negative electrode active material and a binder onto both sides of a negative electrode core member, and in a specific region, applying the mixture onto only one side of the core member (step (2)). In the same manner as above, it should be noted that the active material layer of the negative electrode is carried on neither side of the core member, from one end of the negative electrode nearer the region where the active material layer is carried on only one side of the core member, to the starting position of the region where the active material layer is carried on only one side of the core member.

An exemplary method for producing a negative electrode is given below. 100 parts by weight of artificial graphite powder which serves as the negative electrode active material is mixed with 1 part by weight of styrene-mathacrylic acid-butadiene copolymer (available from Zeon Corporation) and 1 part by weight of carboxymethyl cellulose. The resultant mixture is dispersed in deionized water, to prepare a negative electrode mixture slurry. The resultant slurry is applied onto both sides of a negative electrode core member made of copper foil while leaving the region where the active material layer is carried on neither side on the negative electrode core member. In a specific region, the slurry is applied onto only one side of the core member, to obtain a negative electrode precursor. This negative electrode precursor is dried and rolled, to obtain a negative electrode.

It should be noted that the region where the active material layer is carried on neither side of the core member may be provided for both the positive electrode and the negative electrode, or it may be provided for one of the positive electrode and the negative electrode depending on the sequence of winding the positive electrode and the negative electrode around the winding core.

Next, a porous film is formed on both sides of the resultant positive electrode and/or the negative electrode (step (3)). Specifically, the porous film can be formed as follows.

90 parts by weight of alumina powder with a mean particle size of 0.4 μm is mixed with 10 parts by weight of alumina powder with a mean particle size of 0.05 μm, to prepare an alumina powder mixture. 100 parts by weight of this alumina powder mixture is mixed with 1 part by weight of acryl nitrile-acrylate copolymer rubber particles (BM500B available from Zeon Corporation) and 1 part by weight of polyvinylidene fluoride resin, to obtain a mixture. This mixture is dispersed in dehydrated N-methyl-2-pyrrolidone, to prepare a slurry. The resultant slurry is applied onto the negative electrode active material layer and/or the positive electrode active material layer by a comma roll coater so as to have a thickness of 20 μm. It is then dried at 100° C. for approximately 15 minutes by hot air drying. By performing this series of operations on both sides of the electrode, the negative electrode and/or the positive electrode having the porous films can be obtained.

The positive electrode and the negative electrode thus obtained are wound around the winding core such that the region where the active material layer is formed on only one side of the core member is positioned on the initial winding side, to obtain an electrode group (step (4)).

In the case of the electrode group of FIG. 1, for example, the negative electrode 2 has the region where the active material layer is carried on neither side of the core member, the region where the active material layer is carried on only one side of the core member, and the region where the active material layer is carried on both sides of the core member, in sequence.

A part of the region 2$d$ where the active material layer is carried on neither side of the core member is sandwiched between the upper winding core 1$a$ and the lower winding core 1$b$. Then, the negative electrode 2 and the positive electrode 3 are wound around the winding core 1, with the positive electrode 3 between the negative electrode 2. This produces an electrode group in which the region 2$c$ where the active material layer is carried on only one side of the core member is disposed on the initial winding side.

Thereafter, the electrode group thus produced is inserted into a battery can, and an electrolyte is injected therein. By sealing the opening of the battery can, a cylindrical battery having, for example, a diameter of 18 mm and a height of 65 mm (capacity: 2000 mAh) can be produced.

As the electrolyte, a combination of a solute and an organic solvent used in lithium ion secondary batteries can be selected. For example, an electrolyte obtained by dissolving a lithium salt in a solvent mixture of cyclic carbonic acid ester and chain carbonic acid ester can be used. An exemplary electrolyte is obtained by adding 4% by weight of vinylene carbonate to a solvent mixture of ethylene carbonate, ethyl methyl carbonate, and dimethyl carbonate in a volume ratio of 1:1:1, and further dissolving lithium hexafluorophosphate (LiPF$_6$) therein at a concentration of 1 mol/liter. It is also possible to use other electrolytes than this electrolyte.

Embodiment 2

Figure 2:
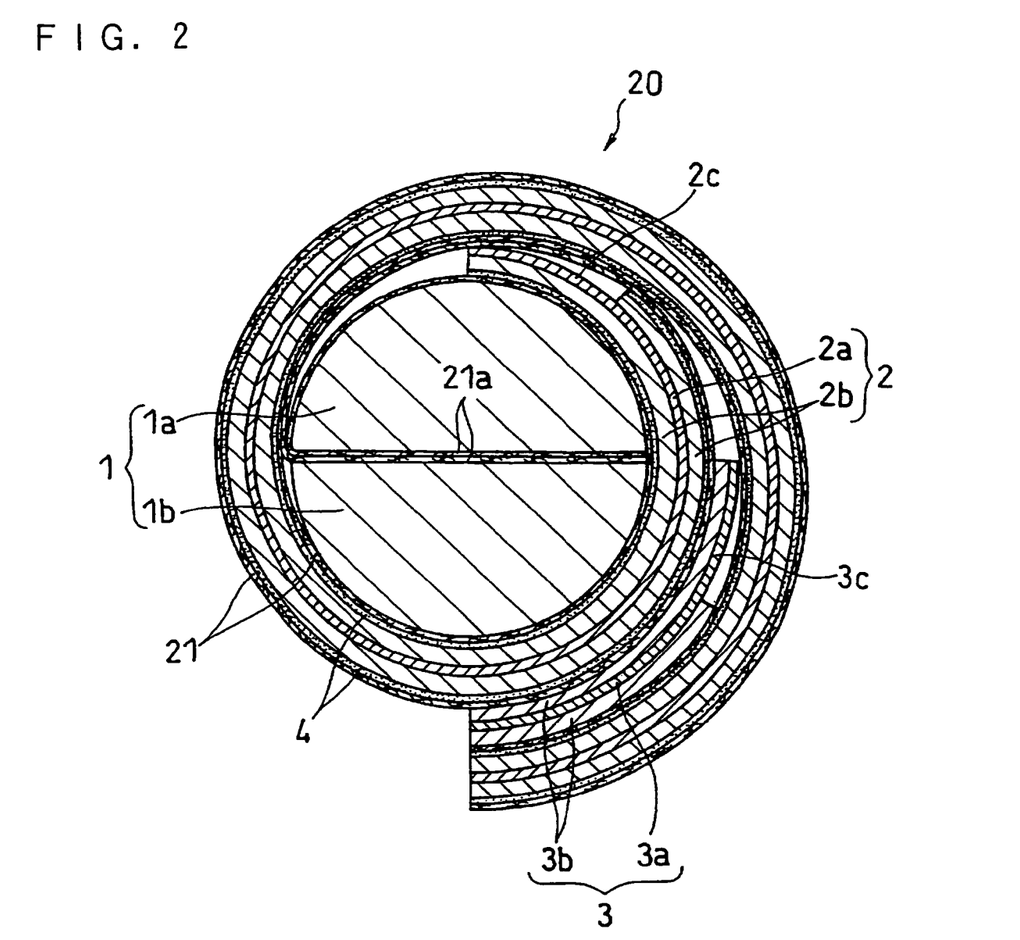
FIG. 2 is a schematic transverse sectional view illustrating a part of an electrode group 20 of a lithium ion secondary battery according to another embodiment of the present invention.

FIG. 2 shows a part of an electrode group 20 of a lithium ion secondary battery according to another embodiment of the present invention. The electrode group 20 of FIG. 2 is different from the electrode group of FIG. 1 in that a separator is interposed between the negative electrode and the positive electrode, but except for this difference, it is the same as the electrode group of FIG. 1. In FIG. 2, the same constituent elements as those in FIG. 1 are given the same numbers.

In the electrode group 20 of FIG. 2, the negative electrode 2 is sandwiched between two separators 21. Also, on the initial winding side of the negative electrode 2, the negative electrode core member 2a extends only to the part 2c.

In the electrode group of FIG. 2, the separators 21 extend beyond the initial winding position of the negative electrode 2, and the extended parts 21a of the separators 21 are sandwiched between the upper winding core 1a and the lower winding core 1b. Thereafter, the negative electrode 2 and the positive electrode 3 are wound around the winding core 1, with the positive electrode 3 between the negative electrode 2, to produce the electrode group.

In this embodiment, since the porous film 4 is used in combination with the independent separator 6, the thickness of the porous film 4 can be reduced in comparison with the Embodiment 1. If the porous film 4 is thin, the porous film 4 becomes flexible, thereby making the porous film resistant to cracking. As a result, even if strain is exerted on the porous film 4, the breakage of the porous film 4 can be reduced. If the porous film is thick, it is subject to cracking.

Also, as described above, the use of the independent separator makes it possible to sufficiently insulate the positive electrode from the negative electrode even if the porous film is thin.

The separator can be composed of a sheet of polyolefin, such as polyethylene or polypropylene. Also, the polyolefin sheet may be one obtained by uniaxial drawing or biaxial drawing.

When the separator is interposed between the negative electrode and the positive electrode, the thickness of the porous film is preferably in the range of 1 to 5 μm. If the thickness of the porous film is less than 1 mm, the safety may become insufficient, or the electrolyte retention may deteriorate. If the thickness of the porous film exceeds 5 mm, the electric characteristics may degrade, or the ionic permeability may decrease.

Further, in this embodiment, the negative electrode and the positive electrode also have the parts 2c and 3c where the active material layer is provided on only one side of the core member, on the initial winding side thereof. Thus, the gap created by the edge of the electrode becomes half the thickness of the conventional electrode in which the active material layer is provided on both sides of the core member. Thus, it is possible to prevent the gap from causing cracking of the electrode at the outer turn of the electrode group relative to the gap, and subsequent destruction of the porous film 4.

Embodiment 3

Figure 3:
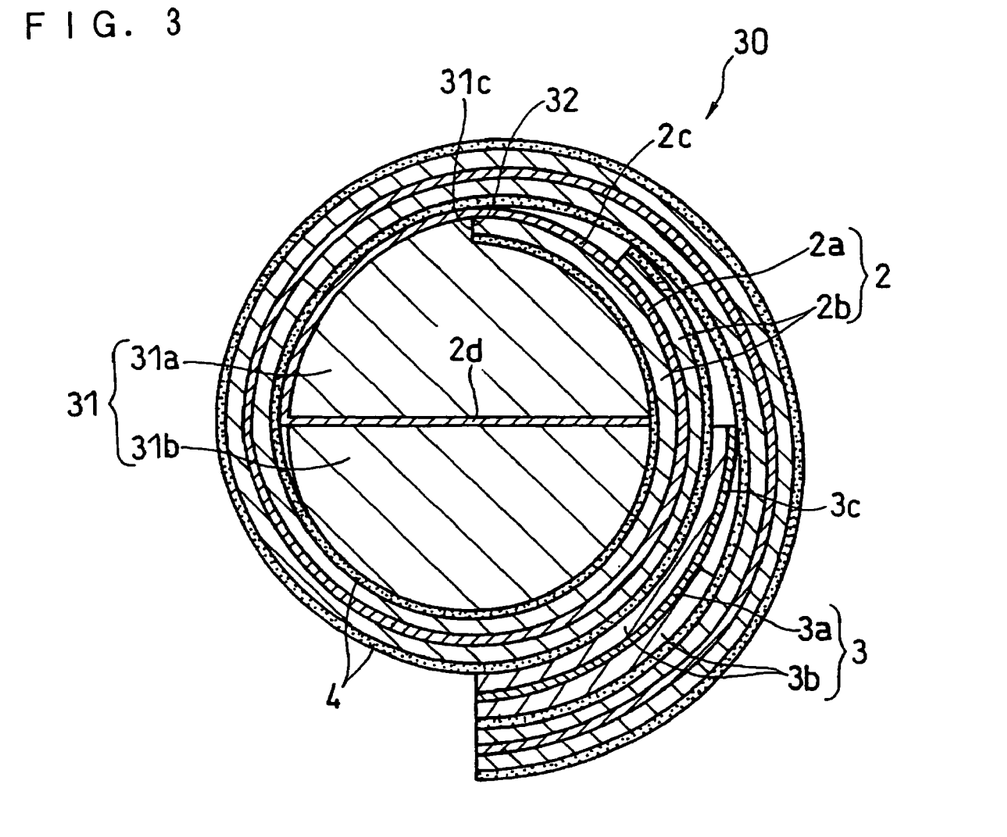
FIG. 3 is a schematic transverse sectional view illustrating a part of an electrode group 30 of a lithium ion secondary battery according to another embodiment of the present invention.

FIG. 3 shows a part of an electrode group 30 of a lithium ion secondary battery according to another embodiment of the present invention. In FIG. 3, the same constituent elements as those of FIG. 1 are given the same numbers.

In the electrode group 30 of FIG. 3, a winding core 31 comprises an upper winding core 31a and a lower winding core 31b. The upper winding core 31a has a recess 31c with a height corresponding to at least a part of the thickness of the part 2c of the negative electrode 2 where the active material layer is formed on only one side of the core member.

The recess 31c can be provided at a position where an edge 32 (i.e., the starting position of the active material layer) of the part 2c of the negative electrode 2 where the active material layer is provided on only one side of the core member comes into contact with the winding core when the belt-like negative electrode 2 is wound around the winding core, along the portion of the winding core the edge 32 contacts. For example, when the edge 32 of the negative electrode 2 is in contact with the generatrix of the curved surface of the winding core, the recess 31c is provided along the generatrix.

Also, the recess 31c can be formed by providing the winding core with a depression from the position of the winding core the edge of the part 2c contacts to a predetermined position.

Also, in the electrode group of FIG. 3, the sum of the thickness of the negative electrode active material layer and the thickness of the porous film is equal to the height of the recess 31c. In this way, by providing the winding core 31 with the recess 31c, the gap created by the edge 32 of the negative electrode 2 is eliminated. Further, since the parts 2c and 3c where the active material layer is provided on only one side of the core member are provided at the innermost turn of the electrode group, they can produce the effect of intensively reducing the strain near the innermost turn of the electrode group.

Also, in producing the electrode group as illustrated in FIG. 3, the length of the part 2d where the active material layer is formed on neither side of the core member is determined in advance such that the edge 32 of the region where the active material layer is provided on only one side of the core member fits to the recess 31c.

Embodiment 4

Figure 4:
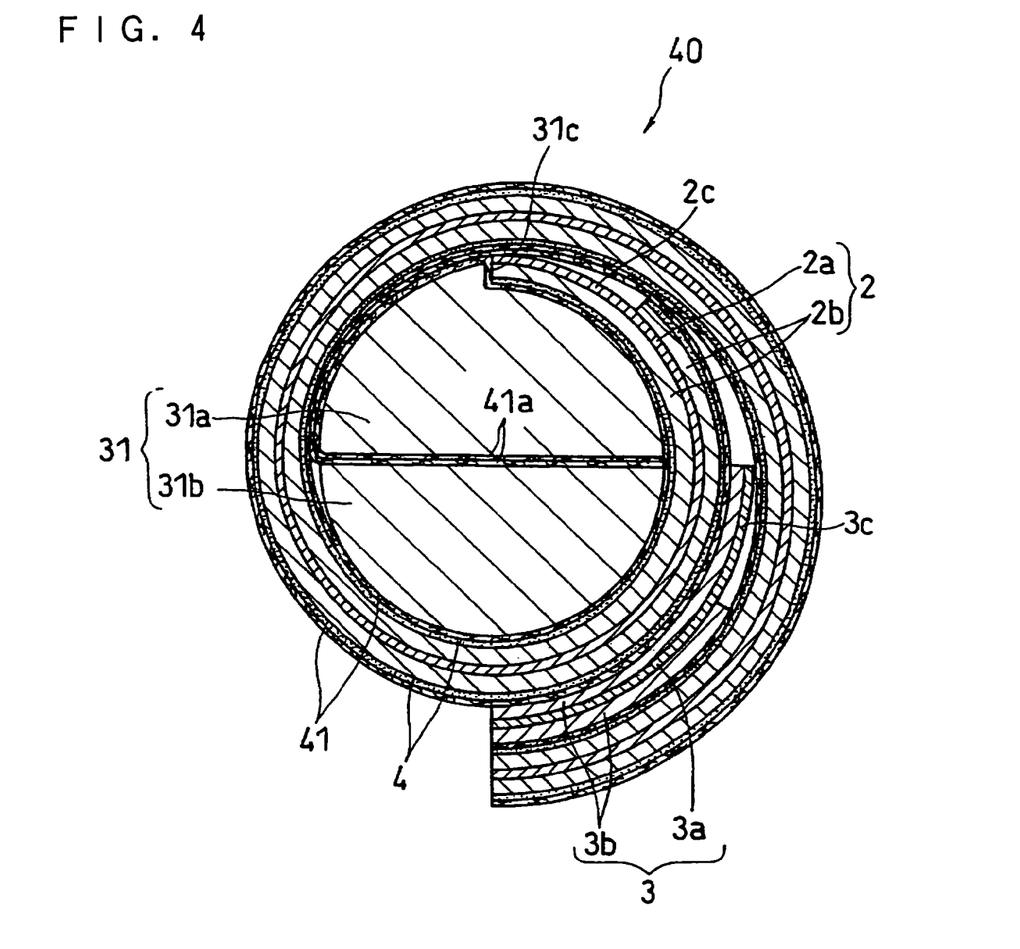
FIG. 4 is a schematic transverse sectional view illustrating a part of an electrode group 40 of a lithium ion secondary battery according to another embodiment of the present invention.

FIG. 4 shows a part of an electrode group 40 of a lithium ion secondary battery according to still another embodiment of the present invention. The electrode group 40 of FIG. 4 is different from the electrode group of FIG. 3 in that a separator is interposed between the negative electrode and the positive electrode, but except for this difference, it is the same as the electrode group of FIG. 3. In FIG. 4, the same constituent elements as those of FIG. 3 are given the same numbers.

In the electrode group 40 of FIG. 4, also, the negative electrode 2 is sandwiched between two separators 41 in the same manner as in Embodiment 2. Also, on the initial winding side of the negative electrode 2, the core member extends only to the part 2c. Further, the separators 41 extend beyond the initial winding position of the negative electrode 2, and the extended parts 41a of the separators 41 are sandwiched between the upper winding core 1a and the lower winding core 1b.

In this embodiment, also, since the independent separator 41 is interposed between the negative electrode and the positive electrode, the thickness of the porous film 4 can be reduced.

Further, in the electrode group of FIG. 4, the sum of the thickness of the part 2c (which comprises the core member, the active material layer, and the porous film) of the negative electrode 2 and the thickness of the separator is equal to the sum of the height of the recess 31c and the thickness of the separator.

By providing the electrodes with the region where the active material layer is provided on only one side of the core member, the gaps created by the edges of the electrodes are eliminated. Also, since the parts 2c and 3c where the active material layer is provided on only one side of the core member are provided at the innermost turn of the electrode group, they can produce the effect of intensively reducing the strain near the innermost turn of the electrode group. Further, by providing the separator between the negative electrode and the positive electrode, the thickness of the porous film can be reduced in the same manner as in Embodiment 2. Therefore, it is possible to reduce the breakage of the porous film near the innermost turn of the electrode group.

Also, in the same manner as in Embodiment 3, it is preferable that the height of the recess 31c correspond to, for example, at least a part of the thickness of the part 2c of the negative electrode 2.

Further, in producing the electrode group as illustrated in FIG. 4, the length of the part of the separator extending beyond the initial winding position of the negative electrode 2 is determined in advance such that the edge of the part 2c of the negative electrode fits to the recess 31c, in the same manner as in Embodiment 3.

INDUSTRIAL APPLICABILITY

The lithium ion secondary battery of the present invention is useful, for example, as the power source for portable appliances that require excellent safety.

The invention claimed is:

1. A lithium ion secondary battery including an electrode group that comprises:
    (1) a winding core,
    (2) a positive electrode comprising a positive electrode core member and a positive electrode active material layer carried on said positive electrode core member,
    (3) a negative electrode comprising a negative electrode core member and a negative electrode active material layer carried on said negative electrode core member, and
    (4) a porous film formed on at least one of said positive electrode and said negative electrode,
    wherein said porous film comprises a filler and a binder,
    said positive electrode and said negative electrode are wound around said winding core, and
    said positive electrode and/or said negative electrode have/has, on the initial winding side, a region where said active material layer is carried on neither side of said core member and an adjoining region where said active material layer is carried on only one side of said core member.

2. The lithium ion secondary battery in accordance with claim 1, wherein a separator is disposed between said positive electrode and said negative electrode.

3. The lithium ion secondary battery in accordance with claim 1, wherein a lead is provided in the region of said positive electrode or said negative electrode where the active material layer is carried on neither side of said core member.

4. The lithium ion secondary battery in accordance with claim 1, wherein on the initial winding side said winding core has a recess at a position where it comes into contact with the starting position of the active material layer of said positive electrode or said negative electrode, and said recess corresponds to at least a part of the thickness of said positive electrode or said negative electrode.

5. A method for producing a lithium ion secondary battery, comprising the steps of:
    (a) forming a positive electrode active material layer on both sides of a positive electrode core member, to obtain a positive electrode,
    (b) forming a negative electrode active material layer on both sides of a negative electrode core member, to obtain a negative electrode,
    (c) forming a porous film that comprises a filler and a binder on a surface of said positive electrode and/or said negative electrode, and
    (d) winding said positive electrode and said negative electrode around a winding core, to obtain an electrode group,
    wherein said step (a) and/or said step (b) comprise/comprises the step of providing, on the initial winding side of said positive electrode and/or said negative electrode, a region where said active material layer is carried on neither side of said core member and an adjoining region where said active material layer is carried on only one side of said core member.

6. The method for producing a lithium ion secondary battery in accordance with claim 5, wherein said positive electrode and said negative electrode are wound around said winding core with a separator interposed therebetween in said step (d).

7. The method for producing a lithium ion secondary battery in accordance with claim 5, further comprising the step of welding a lead to said region of said positive electrode or said negative electrode where the active material layer is carried on neither side of said core member.

8. The method for producing a lithium ion secondary battery in accordance with claim 5, further comprising the step of, on the initial winding side, providing said winding core with a recess at a position where it comes into contact with the starting position of the active material layer of said positive electrode or said negative electrode, said recess corresponding to at least a part of the thickness of said positive electrode or said negative electrode.

\* \* \* \* \*